March 3, 1964     H. PARSONS     3,123,409
BRAKE RELEASE FOR TRAIN AUTOMATIC AIR BRAKE SYSTEM
Filed March 22, 1962     2 Sheets-Sheet 2
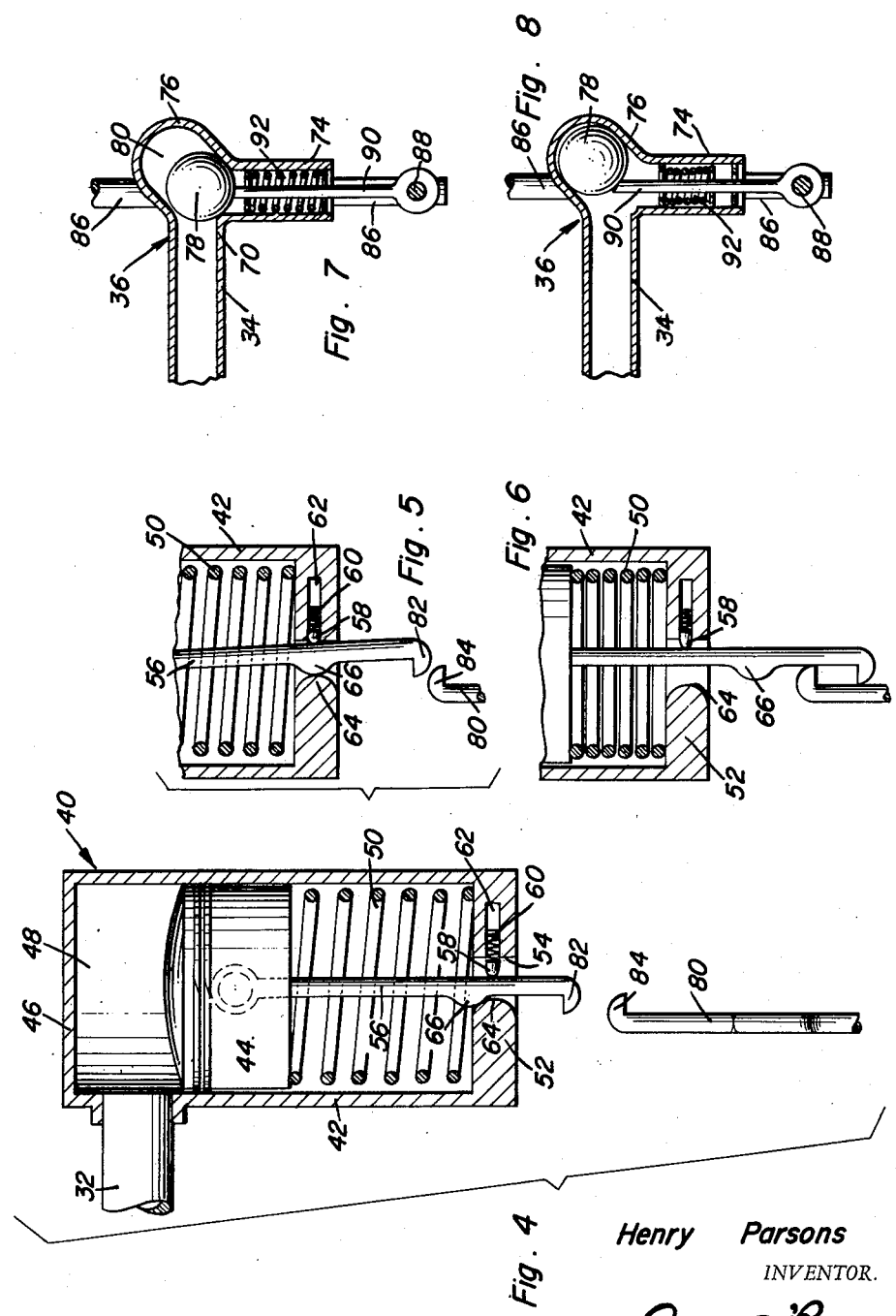
Henry Parsons
INVENTOR.

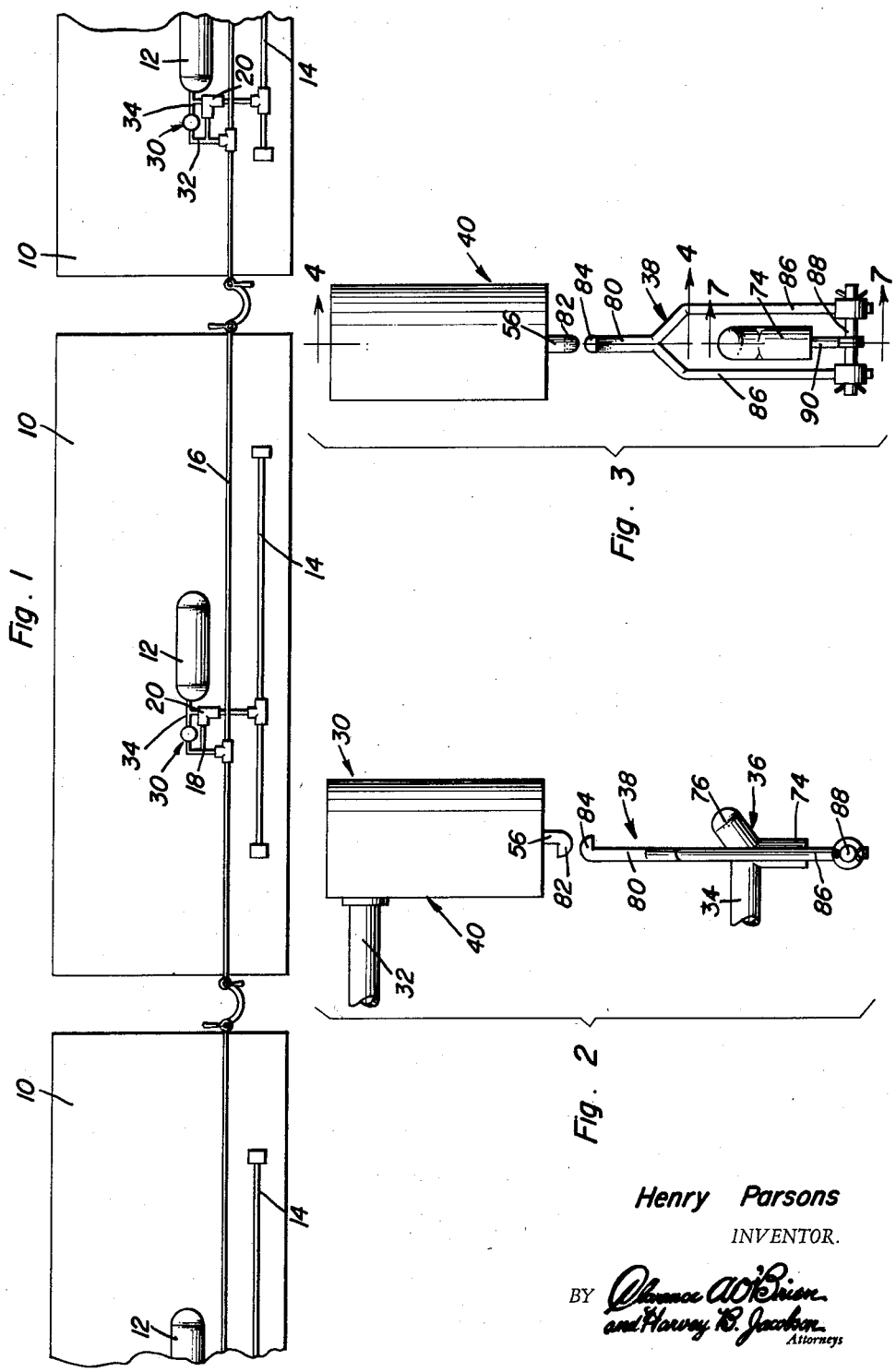

United States Patent Office 3,123,409
Patented Mar. 3, 1964

3,123,409
BRAKE RELEASE FOR TRAIN AUTOMATIC
AIR BRAKE SYSTEM
Henry Parsons, % John Howard, 610 Williams St., Bakersfield, Calif., assignor of forty-nine percent to John Howard and two percent to John M. Nairn, both of Bakersfield, Calif.
Filed Mar. 22, 1962, Ser. No. 181,655
8 Claims. (Cl. 303—70)

This invention comprises a novel and useful brake release for train automatic air brake systems and more particularly pertains to a pressure operated device connected to and controlled by a selected range of variation in the train line pressure and automatic air brake system, and which is operative to automatically vent or bleed the individual railway car brake reservoir of its pressure to thereby release the brakes on that car.

In conventional automatic railway air brake systems such as the well-known York and Westinghouse, controlled variations in the train line pressure are utilized to effect the automatic application of and release of the brakes of the individual cars through control of the car brake reservoirs. It is frequently desirable, particularly in the handling of freight trains, to from time to time release or vent the pressure of the individual car brake reservoirs.

It is therefore the primary purpose of this invention to provide a device which will facilitate the venting of or the release of pressure from individual car reservoirs in order to insure release of the car brakes.

A further object of the invention is to provide a brake reservoir bleed or release mechanism which shall be completely controlled through selective variation of the train line pressure by the engineer.

A further object of the invention is to provide an automatic brake reservoir bleeder in accordance with the foregoing objects which shall be capable of being readily applied as an attachment of adjunct to conventional automatic air brake systems with a minimum amount of change or connections required and which shall in no way interfere with the normal operation of the air brake system by the engineer.

A further and more specific object of the invention is to provide a brake reservoir bleeder mechanism as set forth in the preceding objects whose operation shall be automatically effected by varying the train line pressure at a range which is above the normal brake operating pressure of the air brake system.

Yet another object of the invention is to provide a bleeder mechanism for brake reservoirs in accordance with the above set forth objects which upon actuation of the brake reservoir release valve to vent pressure thereof will automatically return to its initial condition in readiness for the next operation thereof.

These together with objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a diagrammatic view in plan showing a portion of a conventional automatic railway air brake system with the essential elements thereof and to which the bleeder mechanism of this invention has been applied;

FIGURE 2 is a view in side elevation of a portion of the brake reservoir bleeder of this invention shown in its normal position in readiness for operation;

FIGURE 3 is a view taken at right angles to FIGURE 2 and showing the location of the components of the bleeder mechanism;

FIGURE 4 is a view taken upon a somewhat larger scale and substantially upon the plane indicated by section line 4—4 of FIGURE 3 and in vertical cross section showing certain details of the bleed mechanism;

FIGURE 5 is a fragmentary detail view similar to FIGURE 4 but showing the position of certain parts thereof during the return movement of the bleed mechanism to its normal inoperative or rest position;

FIGURE 6 is a further detail view similar to FIGURE 5 but showing the position of the parts during the first portion of the operating cycle of the mechanism in readiness for actuating the release valve mechanism of the brake reservoirs;

FIGURE 7 is a detailed view taken substantially upon the plane indicated by vertical section line 7—7 of FIGURE 3 and showing a portion of the release valve assembly in the valve closed position; and FIGURE 8 is a view similar to FIGURE 7 but showing the release valve assembly in the vented position after actuation of the bleeder mechanism of this invention.

FIGURE 1 shows diagrammatically the essential portions of an automatic railway air brake system with which the present invention is concerned. In this figure the numeral 10 designates the individual railway cars, each of which carries upon its underside a brake reservoir 12 which through the brake pressure lines 14 actuates the usual brake cylinders and the wheel brakes on the car, not shown, in a manner well understood in the art. The train line 16 is also indicated by means of which compressed air from a main reservoir usually mounted in the locomotive is made available to each of the cars and the brake mechanisms thereof. In conventional practice it will be understood that a normal brake operating pressure range is maintained in the train line which is adjustably varied under the control of the engineer in order to effect the various functions required in the operation of the automatic brake system. In certain instances, as for example in freight trains, it is customary to have the upper limit of this automatic operating range at about 90 lbs. pressure.

As will be noted from FIGURE 1, the brake reservoir 12 is connected to the train line 16 by a branch pipe 18 and which includes the automatic pressure responsive control valve 20 commonly known as a triple valve. The function of this valve is to charge the brake reservoir 12 after each application of the brakes; to apply the pressure of the brake reservoir to the brake pipes 14 when the train line pressure is dropped to a predetermined reduced pressure in the normal operating range. In accordance with this invention, an attachment is provided which is operable by pressure variations within a range which is above the normal operating range of the automatic brake system and above the normal upper limit of the pressure maintained in the train line 16 in order to selectively actuate a release valve assembly to thus vent the brake reservoirs 12 to the atmosphere and thus insure release of the car brakes. This attachment which forms the subject matter of this invention will be now described.

As shown in FIGURE 1, the attachment which is designated generally by the numeral 30 is shown connected by conduit 32 to the train line 16 as for example at the same connection of the triple valve 20 therewith and is further shown connected by a conduit 34 with the brake reservoir 12. Obviously, the train line pressure can be applied to the appropriate components of this bleeder mechanism and the latter in turn may establish communication between the brake reservoir 12 and the atmosphere in various manners and in any desired location with respect to the conventional automatic train brake system.

Reference is now made more specifically to the details shown in FIGURES 2–8 of the construction and operation of the brake reservoir bleeder or pressure release mechanism of this invention.

The bleeder mechanism disclosed and claimed hereinafter comprises a pressure release means for each car brake reservoir 12, the pressure release means being indicated generally by the numeral 36. A connecting means indicated generally by the numeral 38, see FIGURES 2 and 3 in particular, operatively connects the pressure release means 36 with an actuator means designated generally by the numeral 40. Referring now especially to FIGURE 4 it will be observed that the actuator means comprises a fluid pressure operated actuating cylinder or member 42 having slidably received therein a fluid pressure actuated piston 44. The cylinder has a closed cylinder head or end 46 on the operating side of the piston to provide a fluid pressure actuating chamber 48 therebetween with which the conduit 32 communicates. The piston is yieldingly urged to an upward position in the cylinder in FIGURE 4 by means of a compression spring 50. This compression spring is of a force which is greater than the top limit of the normal brake operating pressure range of the railway brake system, as for example 110 lbs. The spring therefore keeps the piston in its upper position as long as the operating pressure in the train line 16 is below the pressure of the spring 50.

The lower end of the cylinder of the member 42 is provided with a closure wall 52 having an opening 54 therethrough through which extends the piston rod 56.

The opening 54 is considerably greater in width than the thickness of the rod 56 so that the latter may move back and forth in this opening, being retained against one side of the opening resiliently as by a plunger 58 urged by a spring 60 within a bore 62 against the piston rod as shown in FIGURES 4–6.

The adjacent surfaces of the piston rod and of the cylinder wall 52 of the slot 54 are provided with cooperating cam surfaces consisting of a cam projection 64 in the wall and a cam projection 66 on the piston rod. As will be seen from a comparison of FIGURES 4, 5 and 6, the operation of this portion of the mechanism is as follows:

With the train line pressure lying within its normal operating range, the spring 50 is able to overcome the train line pressure thus maintaining the piston 44 at its upper limit of travel, at which time the projection 66 lies above the projection 64 and with the piston rod held against the projection 64 by means of the spring plunger 58. However, when the train line pressure is increased above the upper limit of its normal operating range, that is, above the pressure of the spring 50, the piston will be driven downwardly thus causing downward travel of the piston rod 56 through the slot or aperture 54. During this downward travel, as shown in FIGURE 5, the cam projection 66 on the rod will ride across the cam projection 64 on the end of the cylinder thus causing the piston rod to swing outwardly toward the other side of the slot against the resistance of the spring plunger 58. However, as soon as the cam projections pass each other, the piston rod may be urged backwardly towards the original position as shown in FIGURE 6. Similarly when the pressure in the chamber 48 is reduced below the pressure to which the spring 50 is set, as by decrease in the train line pressure below the pressure rise therein, the spring will move the piston and piston rod upwardly, and the cam surfaces will swing the piston rod first in a counter-clockwise direction against the spring plunger 58 and after the projections have cleared the spring plunger will move the rod back toward the original position of FIGURE 4. The pair of downward and upward strokes comprise a complete operating cycle of the actuator member or pressure operated member of the bleeder mechanism.

Referring next more specifically to FIGURES 7 and 8 it will be seen that the release valve assembly 36 includes a valve casing 70 having the conduit 70 which is in continuous communication with the brake reservoir 12 and further having a tubular boss 74 which is in communication with the atmosphere. Between the conduits 34 and 74 there is provided an upwardly inclined valve chamber 76 in which is movably received a release valve such as a ball check valve 78. The arrangement is such that under the influence of gravity the valve 78 normally seats upon the valve seat formed at the junction of the casing 70 with the vent conduit 74 as shown in FIGURE 7, with the pressure of the brake reservoir as applied to the conduit 34 assisting and maintaining the valve upon its seat. However, when the valve is raised from its seat, as shown in FIGURE 8, it will move upwardly into the clearance space 80 provided in the valve chamber 76 so as to uncover the valve seat and permit the brake reservoir to be vented to the atmosphere through the conduit 34 and 74 which are now placed in communication. Once the valve has been lifted, it will be appreciated that the pressure of the escaping air will maintain the valve in its upward position and against the upper wall of the valve chamber 76.

A connecting means indicated generally by the numeral 38 is provided for operatively connecting the operator member 42 with the valve assembly to connect controlled operation of the latter. This connecting means is arranged as follows:

Disposed in substantial alignment with the piston rod 56 is a connecting link 80. The adjacent ends of the piston rod and connecting link are provided with complementary cooperating hook elements 82 and 84 respectively, with the adjacent ends of the piston rod and the connecting link 80 having rounded or sloping surfaces to facilitate passage of the ends past each other, as suggested in the showing of FIGURE 5. However, this passing movement may be facilitate and in some instance may be effected entirely by the operation of the two cam projections 64 and 66 previously mentioned and described.

In any event, the connecting link 80 has its upper hooked extremity 84 disposed in slightly spaced relation from the extremity 82 of the piston rod in the normal inoperative position of the device. At its lower end, the connecting link 80 is bifurcated consisting of a pair of parallel arms each indicated at 86 which at their lower ends are provided with a transverse pin 88 extending therebetween. These arms are positioned to embrace the valve assembly 36 and to provide adequate working clearance therewith. Pivoted on the pivot pin 88 is an operating rod 90 which extends through the vent passage 74 of the valve assembly and into position for engaging and lifting the check valve 78 from its seat as will be seen from a comparison of FIGURES 7 and 8. A spring 92 is preferably provided in the vent passage 74 and cooperates with the actuator rod for urging the latter downwardly or away from the valve 78 to permit the latter to be seated under the influence of gravity.

The operation of the connecting means in conjunction with the operation of the release valve assembly 36 and the actuator means 40 is as follows:

As long as the train line pressure in the train line 16 is maintained in its normal operating limits, the spring 50 is allowed to maintain the piston and the piston rod 56 in their raised positions as shown in FIGURES 2–4, so that the engaging or hook elements 82 and 84 are out of contact with each other. Consequently, fluctuations of train line pressure during the normal operation of the brakes is ineffective to couple the piston rod with the connecting link 80.

However, when the engineer desires to actuate the brake reservoir bleeder mechanism of this invention and empty the car brake reservoirs 12, he operates the train line pressure control means and effects an increase in the train line pressure above the normal operating range. This pressure rise, when it reaches a pressure sufficient to overcome the spring 50, drives the piston 44 downwardly with the piston rod 56.

During this downward travel, the operation of the cam member 64 and 66 swing the piston rod to one side to cause it to clear the extremity of the connecting link 80 and permit the hooks to pass each other as will be seen from a comparison of FIGURES 5 and 6. The connecting means is now positioned in readiness for actuating the release means. The engineer now reduces the increased pressure in the train line sufficient to permit the spring 50 to drive the piston 44 upwardly. This upward travel causes the hooks 82 and 84 to engage and the operator piston 44 thus lifts the connecting link 80 and through the associated linkage lifts the actuator rod 90 and unseats the check valve 78. Further upward travel of the connecting link 80 by the piston rod 56 causes the latter through the operation of the cam members to again swing to one side and thus release the engagement of the hooks 82 and 84. This allows the spring 92 to drive the actuator rod 90 and the associated connecting means back to their inoperative position allowing the valve 78 to drop by gravity into its seat. However, once the valve has been unseated, it will be maintained unseated until all the pressure from the reservoir 12 has been exhausted through the exhaust conduits 74. Thereafter the valve will drop by gravity into its seat and the device will be in position for its next operation.

It is an important feature of this invention that use is made only of a pressure range which is in excess of normal brake operating pressure range of a train line to effect operation of the brake cylinder bleeder mechanism. Both the pressure increase which engages the connecting means with the release valve mechanism and the pressure reduction which effects the opening of the release valve are at pressures above the normal operating range. Consequently, the reduction of pressure from the pressure rise which reduction effects the unseating valve movement of the device is still at a pressure above the normal operating range so that there is no corresponding operation of the automatic brake system.

It will be appreciated that any suitable guide means may be provided to insure the sliding movement of the connecting link 80 and to maintain its proper relationship to the piston rod 56 during the operation of the device.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A brake reservoir bleeder for a railway automatic air brake system of the type including a train line having maintained therein a normal range of brake operating pressure and a brake reservoir for each car for operating the brakes thereof and connected to said train line; said bleeder comprising a pressure release means for each reservoir operable for connecting the latter to the atmosphere and actuator means for each release means including a pressure operated member and a connecting means operable for connecting said member to said release means, said pressure operated member being responsive to a rise in pressure above said normal pressure range for operably connecting said pressure operated member to said release means by said connecting means and being then responsive to a pressure decrease below said pressure rise for effecting by said connecting means venting of said reservoir by said release means.

2. The combination of claim 1 wherein said connecting means includes a rod and said release means includes a link, said rod and link having cooperating hooks engageable to connect said rod and link for movement as a unit in one direction.

3. The combination of claim 2 including cam means associated with one of said rod and link and effecting lateral movement thereof to disengage said hooks and thereby permit movement of said hooks past each other.

4. The combination of claim 3 wherein said cam means comprises cam projections on said pressure operated member and on said rod.

5. The combination of claim 4 including spring means yieldingly urging said cam projections towards each other.

6. The combination of claim 1 wherein said pressure release means includes a link means and a valve casing having passage means communicating with a brake reservoir and with the atmosphere for venting the reservoir, a valve in said passage means gravity urged to a position stopping flow through said passage means, said connecting means being connectible to said link means for moving said valve to a position opening said passage means.

7. The combination of claim 6 wherein said passage means and valve are so disposed as to cause reservoir pressure to yieldingly retain said valve in either of said positions.

8. The combination of claim 1 wherein said pressure release means includes a link means and a valve casing having passage means communicating with a brake reservoir and with the atmosphere for venting the reservoir, a valve in said passage means gravity urged to a position stopping flow through said passage means, said connecting means being connectable to said link means for moving said valve to a position opening said passage means, said link means including an actuator rod slidable towards and from said valve for unseating the latter.

References Cited in the file of this patent

UNITED STATES PATENTS

| 1,494,734 | Clark | May 20, 1924 |
| 1,638,457 | Quates | Aug. 9, 1927 |

FOREIGN PATENTS

| 420,341 | Germany | Oct. 21, 1925 |